(12) United States Patent
Talwar et al.

(10) Patent No.: US 10,691,375 B2
(45) Date of Patent: Jun. 23, 2020

(54) MEMORY NETWORK TO PRIORITIZE PROCESSING OF A MEMORY ACCESS REQUEST

(71) Applicant: Hewlett Packard Enterprise Development LP, Houston, TX (US)

(72) Inventors: Vanish Talwar, Campbell, CA (US); Paolo Faraboschi, Palo Alto, CA (US); Daniel Gmach, Palo Alto, CA (US); Yuan Chen, Sunnyvale, CA (US); Al Davis, Coalville, CA (US); Adit Madan, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/545,915

(22) PCT Filed: Jan. 30, 2015

(86) PCT No.: PCT/US2015/013969
§ 371 (c)(1),
(2) Date: Jul. 24, 2017

(87) PCT Pub. No.: WO2016/122662
PCT Pub. Date: Aug. 4, 2016

(65) Prior Publication Data
US 2018/0004456 A1  Jan. 4, 2018

(51) Int. Cl.
*G06F 3/06* (2006.01)
*G06F 15/173* (2006.01)

(52) U.S. Cl.
CPC .......... *G06F 3/0659* (2013.01); *G06F 3/067* (2013.01); *G06F 3/0611* (2013.01); *G06F 15/17331* (2013.01)

(58) Field of Classification Search
CPC ............. G06F 15/17331; G06F 3/0611; G06F 3/0659; G06F 3/067; G06F 12/084; G06F 12/1072; G06F 9/544; G06F 13/1663
See application file for complete search history.

(56) References Cited

U.S. PATENT DOCUMENTS

| 5,887,134 A | 3/1999 | Zahir | |
|---|---|---|---|
| 6,546,471 B1 * | 4/2003 | Tarui | G06F 12/0284 711/141 |

(Continued)

FOREIGN PATENT DOCUMENTS

WO    WO-0116779    3/2001

OTHER PUBLICATIONS

Entreme Networks; Policy Based Quality of Service tor Enterprise LANs; http://www.csd.uoc.gr/~hy536/PB.pdf ; Jul. 21, 2000.

(Continued)

*Primary Examiner* — Yaima Rigol
(74) *Attorney, Agent, or Firm* — Hewlett Packard Enterprise Patent Department

(57) ABSTRACT

In one example, a memory network may control access to a shared memory that is by multiple compute nodes. The memory network may control the access to the shared memory by receiving a memory access request originating from an application executing on the multiple compute nodes and determining a priority for processing the memory access request. The priority determined by the memory network may correspond to a memory address range in the memory that is specifically used by the application.

16 Claims, 8 Drawing Sheets

(56) References Cited

U.S. PATENT DOCUMENTS

| | | | |
|---|---|---|---|
| 6,678,248 B1 | 1/2004 | Haddock et al. | |
| 7,631,096 B1 | 12/2009 | Yeh et al. | |
| 2002/0095400 A1 | 7/2002 | Johnson et al. | |
| 2002/0120709 A1 | 8/2002 | Chow et al. | |
| 2003/0236861 A1 | 12/2003 | Johnson et al. | |
| 2007/0079377 A1 | 4/2007 | Pagan | |
| 2008/0077741 A1* | 3/2008 | Yasui | G06F 13/18 711/129 |
| 2008/0294598 A1* | 11/2008 | Imai | G06F 17/30168 |
| 2009/0327598 A1* | 12/2009 | Tamura | G06F 3/0613 711/112 |
| 2012/0079232 A1* | 3/2012 | Hinton | G06F 12/0292 711/207 |
| 2013/0290656 A1* | 10/2013 | Staelin | G06F 13/18 711/158 |
| 2014/0123151 A1* | 5/2014 | Kishan | G06F 9/4881 718/103 |
| 2014/0176587 A1 | 6/2014 | Owen et al. | |
| 2015/0019923 A1 | 1/2015 | Michels et al. | |
| 2015/0293709 A1* | 10/2015 | Quach | G06F 3/0674 711/105 |
| 2016/0092379 A1* | 3/2016 | Svendsen | G06F 13/18 711/158 |

OTHER PUBLICATIONS

International Searching Authority, The International Search Report and the Written Opinion, PCT/US2015/013969, dated Jul. 31, 2015, 10 Pages.

N. Saravana Selvam et al, Processor Based Active Queue Management for Providing QoS in Multimedia Application, Mar. 30, 2010, 6 Pgs.

\* cited by examiner

MEMORY NETWORK TO PRIORITIZE PROCESSING OF A MEMORY ACCESS REQUEST

BACKGROUND

With rapid advances in technology, computing systems are increasingly prevalent in society today. Vast computing systems execute and support applications that may communicate and process immense amounts of data, many times with performance constraints to meet the increasing demands of users. Memories store increasing amounts of application data used by these applications, and increasing the efficiency, speed, and effectiveness of computing systems will further improve user experience.

BRIEF DESCRIPTION OF THE DRAWINGS

Certain examples are described in the following detailed description and in reference to the drawings.

DETAILED DESCRIPTION

The disclosure below may provide for prioritization of access to a memory shared by multiple devices, systems, compute nodes, applications, or other processing units. The systems, logic, methods, devices, and circuitry described herein may support providing differentiated quality of service (QoS) for memory access traffic, which may thus allow a computing system to better manage and satisfy service level agreement (SLA) requirements that applications executing in a computing system may specify. The disclosure below may provide for dynamic adjustments to memory access prioritization (e.g., priority levels), for example based on memory access contention, access load, violations of an SLA requirement for applications executing in the computing system, and any other relevant system factor or combinations thereof. Thus, the disclosure below may support increased efficiency and effectiveness in accessing a shared memory in a computing system and support differentiated memory access service to, for examples, applications requiring different service levels of memory access.

Figure 1:
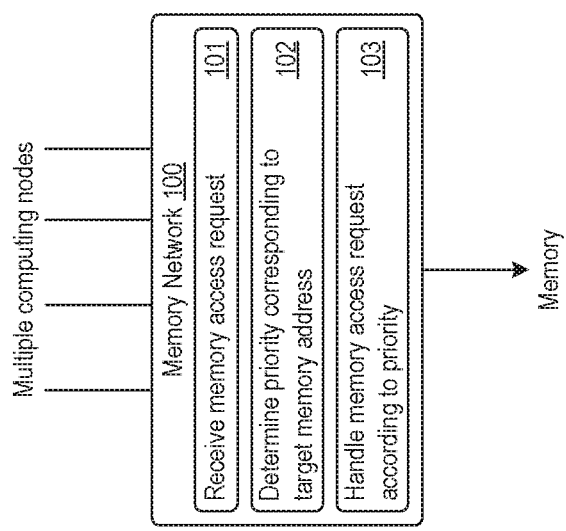
FIG. 1 shows an example of a memory network that supports prioritizing memory accesses to a shared memory.

FIG. 1 shows an example of a memory network 100 that supports prioritizing access to a shared memory. The memory network 100 may also be referred to as a memory fabric. The memory network 100 may include hardware or circuitry that interconnects compute nodes to a memory shared by the compute nodes, for example by routing memory access requests to a corresponding portion of the shared memory. The memory network 100 may thus include a switching fabric, switches, or other routing circuitry to direct memory access requests received from a compute node in a computing system to the portion of the shared memory specified in the memory access request.

The memory network 100 may be communicatively linked to a memory shared by and accessible to the compute nodes. The shared memory may take the form of a random access memory (RAM), which may be a dynamic RAM or a non-volatile RAM for example. In some examples, the shared memory is byte-addressable, thus supporting access to a particular memory address or memory address range within the shared memory. In other examples, the shared memory is block addressable. A memory medium that implements the shared memory may be volatile or non-volatile. Thus, in some examples, the shared memory is a non-volatile computer storage medium, such as a non-volatile RAM, a hard drive, flash memory, optical disk, memristor array, solid state drive, and the like.

The memory network 100 may also be communicatively linked to any number of compute nodes. A compute node may refer to any physical or logical computing entity, examples of which include computing circuitry, a central processing unit (CPU), microprocessor, graphics processing unit, application specific integrated circuitry, a physical computing device, an application server, and more. A compute node may include a memory controller or interface, which may manage memory access traffic for the compute node and interface to the memory network 100.

The memory network 100 may govern access to the shared memory by multiple compute nodes. In that regard, the memory network 100 may route memory access requests received from multiple compute nodes to a corresponding portion of the shared memory. As one illustrative example, the compute nodes may collectively host (e.g., execute) multiple applications that utilize the shared memory to store application data, for example as part of a data center implementation. In this illustration, the memory network 100 may prioritize memory access by the multiple applications to the shared memory, such as by providing a higher access bandwidth for a first application and providing a lower access bandwidth for a second application. In doing so, the memory network 100 may differentiate memory access bandwidth between higher priority applications and lower priority applications, or according to application SLA requirements that vary in memory bandwidth constraints.

The memory network 100 may provide differentiated service for memory access requests received from the multiple compute nodes (or, put another way, from the applications executing on the multiple compute nodes).

In one example shown in FIG. 1, the memory network 100 includes functionalities 101, 102, and 103, which may support the memory network 100 in controlling access to a shared memory by receiving a memory access request from one of the multiple compute nodes, determining a priority for processing the memory access request, and handling the memory access request according to the determined priority for the memory access request. The memory network 100 may determine a priority for the memory access request that corresponds to a target memory address specified in the memory access request. In that regard, the memory network 100 may prioritize memory access to the shared memory according to a portion of the shared memory to be accessed by the memory access request, which may correlate to the application originating the memory access request. Memory address based prioritization of access to the shared memory is described in greater detail below.

Figure 2:
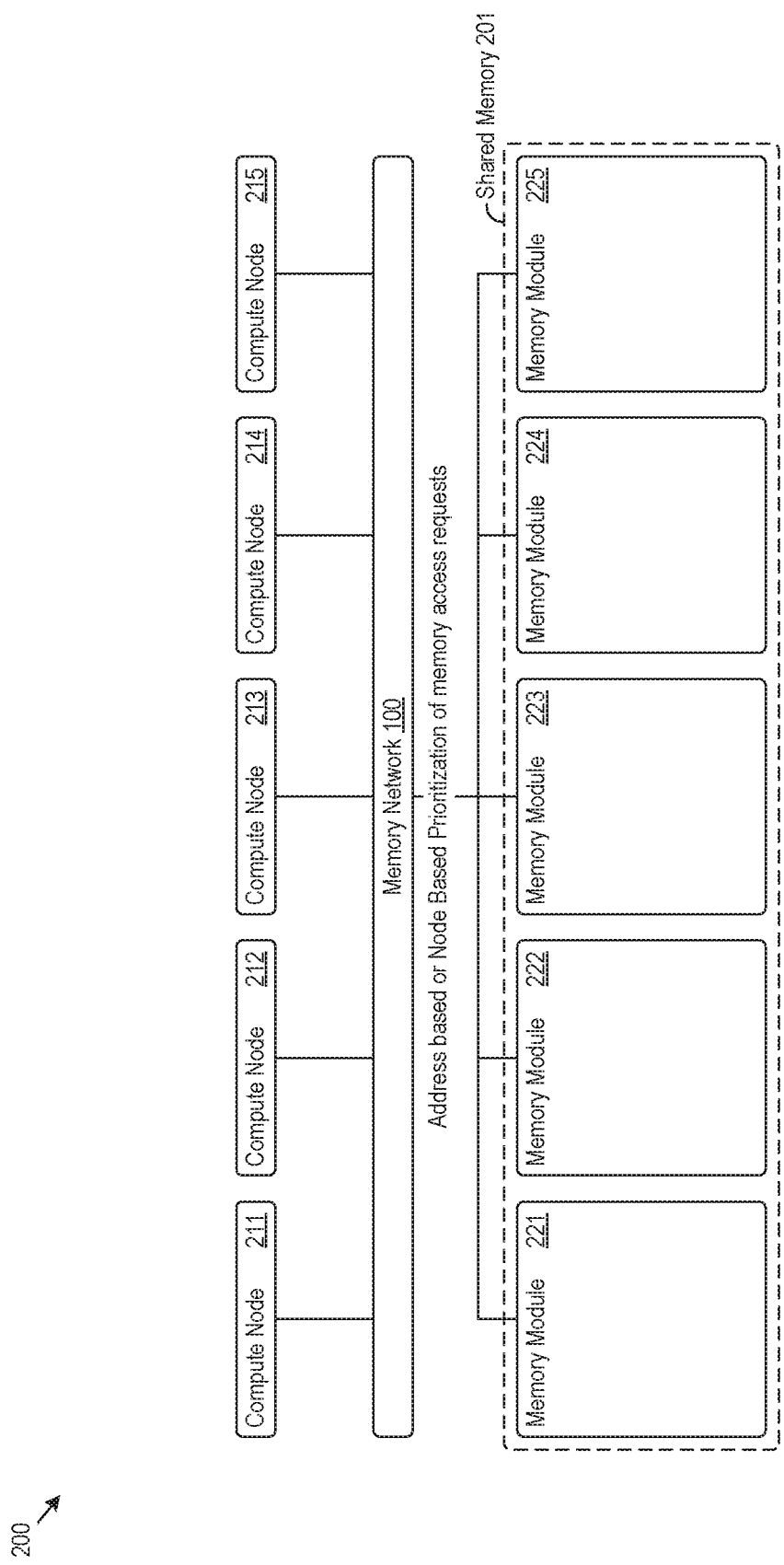
FIG. 2 shows an example of a computing system that includes the memory network.

The memory network 100, compute nodes, and shared memory may form a computing system that may take any number of forms. FIG. 2 shows an example of a computing system 200 that includes the memory network 100. The computing system 200 may be implemented through a rack-scale architecture, and the memory network 100 may physically link compute nodes in a rack to any portion of a shared memory 201, though the memory network 100, the compute nodes, or the shared memory 201 may be part of different racks, in different physical locations, or otherwise remote from one another. In the specific example shown in FIG. 2, the system 200 includes the compute nodes labeled as 211-215.

The computing system 200 includes the shared memory 201. In some implementations, the shared memory 201 includes multiple memory modules that together form the shared memory 201. In the example shown in FIG. 2, the shared memory 201 includes the memory modules labeled as 221-225 and a particular memory module may be physically linked to or a part of a particular compute node. The shared memory 201 may be byte addressable and implement a memory addressing scheme such that the memory modules 221-225 respectively store data corresponding to a particular address range of the shared memory 201. Put another way, the shared memory 201 may implement a data space and a respective memory module may store a respective portion of the data space of the shared memory 201. The shared memory 201 and the memory modules 221-225 may take any number of forms, such as those described above. Specific examples include dynamic RAM (DRAM) or non-volatile RAM.

The computing system 200 may host any number of applications, for example via execution of the applications through the compute nodes 211-215. Executed applications may vary in SLA or QoS requirements. For example, memory bandwidth requirements may vary across applications for database and key-value stores, analytics, multimedia streaming, web service, video transcoding, graph processing, map reduce, or any other application type that the computing system 200 may host. Since the shared memory 201 and the memory network 100 are shared by the compute nodes 211-215 executing the multiple applications, the shared memory 201 and/or the memory network 100 may be subject to contention when the multiple applications request memory access concurrently or within a shortened timeframe. Such memory access contention may lead to application performance degradation, SLA requirement violations, or both. The memory network 100 may provide differentiated service for memory accesses to reduce performance degradation and SLA violations for the applications executing in the computing system 200.

Figure 3:
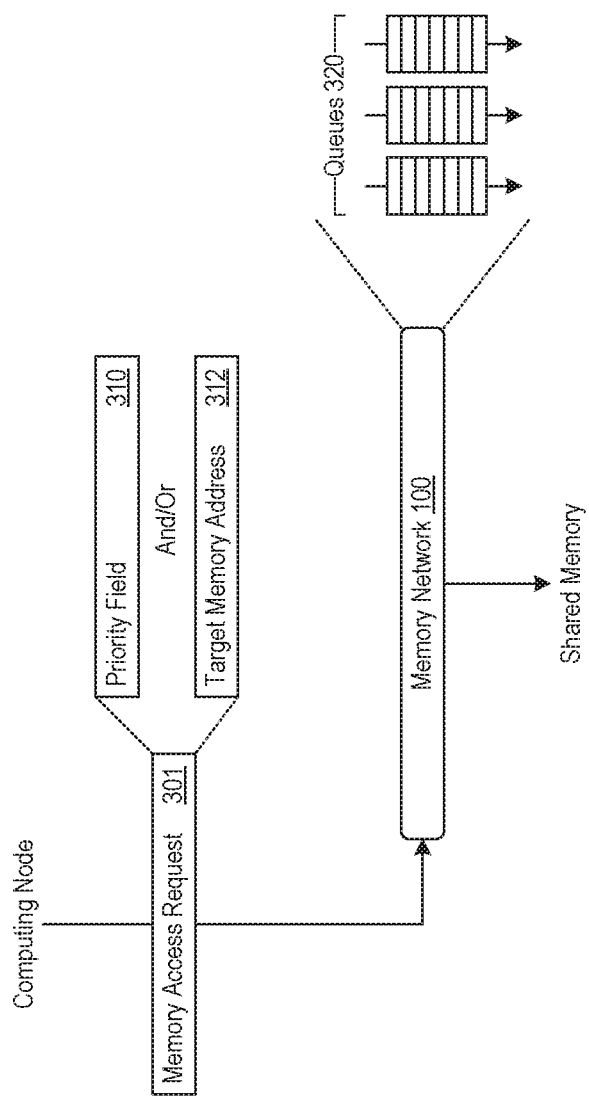
FIG. 3 shows an example of memory access request processing that the memory network may perform.

FIG. 3 shows an example of memory access request processing that the memory network 100 may perform, for example to determine a priority for a memory access request and process the memory access according to the determined priority. The memory network 100 may receive a memory access request 301 from a compute node communicatively linked to the memory network 100. The memory access request 301 may originate from an application executing on the compute node, and may specify access or modification of application data stored in the shared memory 201. As some examples, the memory access request 301 may include a load operation, a store operation, a memory copy operation (e.g., copy data from a source location to a destination location), or any other memory operation accessing data stored in the shared memory 201.

The computing system 200 (or an element thereof) may specify a priority for handling memory accesses originating from a particular application. Put another way, an element of the computing system 200 (such as a compute node or the memory network 100) may label memory access traffic to correspond to a particular priority for processing the memory access traffic. This priority may be referred to as a memory access priority level. A compute node, the memory network 100, or other elements of the computing system 200 may employ explicit and/or implicit labeling schemes in specifying a memory access priority level for a memory access request. In the discussion below, labeling of memory access traffic is described with respect to the memory network 100 as one particular continuing example, though additional or alternative elements in the computing system 200 may likewise label memory access traffic in a consistent manner.

A labeling scheme employed by the memory network 100 may identify a particular application originating the memory access request. The memory access priority level labeled for memory access requests from the originating application may provide a particular QoS level for the originating application in an effort to meet an SLA requirement of the originating application. The memory network 100 may employ any number of labeling schemes to directly or indirectly specify an application originating memory access traffic. Some example memory access labeling schemes are presented next.

In some examples, the memory network 100 labels memory access traffic according to memory address range. Memory accesses targeting data with a particular memory address range (or ranges) in the shared memory 201 may be associated with a particular priority level. For example, the memory network 100 may label a memory access request 301 with a particular priority level when the memory access request 301 stores, loads, or copies data to or from a target memory address within a particular memory address range. Accordingly, different memory access priority levels may be assigned based on memory address range. To further illustrate, accesses to a first memory address range in the shared memory 201 may be assigned an elevated (e.g., high) priority level whereas accesses to a second memory address range in the shared memory 201 may be assigned a non-elevated or lower (e.g., normal) priority level. Various tiers of priority levels may be assigned to access requests, through which the memory network 100 prioritizes memory access through allocation of memory access bandwidth. Two priority tier examples are presented in table 1 and table 2 below:

TABLE 1

Example priority tiers for Memory-Address based labeling

| Priority Level $P_0$ | Highest priority for memory accesses targeting Memory Range $[A_0\text{-}A_n]$ |
|---|---|
| Priority Level $P_1$ | Best effort for memory accesses to all other memory addresses |

TABLE 2

Example priority tiers for Memory-Address based labeling

| Priority Level $P_0$ | Highest priority for memory accesses targeting Memory Range $[A_0\text{-}A_n]$ |
|---|---|
| Priority Level $P_1$ | Next highest priority for memory accesses targeting Memory Range $[B_0\text{-}B_n]$ |

TABLE 2-continued

Example priority tiers for Memory-Address based labeling

| | |
|---|---|
| Priority Level $P_2$ | Best effort for memory accesses to all other memory addresses |
| Priority Level $P_3$ | Best effort for control traffic |

The memory network 100 may allocate a higher proportion of bandwidth for accessing the shared memory 201 to access requests with higher priority levels, thus allowing applications increased use of the shared memory 201.

A memory address range in the shared memory 201 may be correlated to or assigned for use by a particular application. For example, a system management entity may assign a particular memory space (e.g., address range in the shared memory 201) for use by a particular application. As another example, the particular application itself may configure use of a particular memory range in the shared memory 201. In these examples, the memory network 100 may label memory access traffic for the particular application by identifying when the access traffic involves the corresponding memory address range of the shared memory 201 used by the particular application. Elements of the computing system 200 may thus differentiate application memory accesses by differentiating targeted memory address ranges, e.g., through identifying as elevated priority memory address ranges the portion of the shared memory 201 used by higher priority applications. For instance, the memory network 100 may determine an elevated priority for processing memory accesses when a target memory address specified in the memory access request 301 is within an elevated priority memory address range. Thus, the memory network 100 may employ a memory address-based labeling scheme.

In some examples, the memory network 100 labels memory access traffic according to node. A node may refer to any element of the computing system 200, such as a compute node, a memory module, other processing element in the computing system 200, or combinations thereof. In a node-based labeling scheme, the memory network 100 may label a memory access request from a particular node (e.g., a compute node originating the access request), to a particular node (e.g., a particular memory module the memory access will be serviced by or a particular compute node receiving the results of a the memory access), or from a particular node to another particular node (e.g., as part of a memory copy operation).

A particular compute node or memory module in the computing system 200 may be correlated to or used by a particular application executing in the computing system 200. With regards to computing, the application may execute on one of the compute nodes in the computing system 200 or across multiple compute nodes in the computing system 200. With regards to memory, a memory address range assigned for use by the application may be stored through the memory modules in the computing system 200. Accordingly, these nodes (e.g., compute nodes and memory modules) may be correlated to a particular application. The memory network 100 may thus identify nodes associated with the particular application and label memory access traffic for the particular application according to nodes used by the application. Table 3 below shows one example of priority level tiers based on node-based labeling that the memory network 100 may employ:

TABLE 3

Example priority tiers for Node based labeling

| | |
|---|---|
| Priority Level $P_0$ | Highest priority for memory accesses from node A to node B |
| Priority Level $P_1$ | Next highest priority for memory accesses from node A |
| Priority Level $P_2$ | Next highest priority for memory accesses to Node B |
| Priority Level $P_3$ | Best effort for all other memory accesses |

Elements of the computing system 200 may explicitly label memory access traffic. In the example shown in FIG. 3, the memory network 100 may receive a memory access request 301 that includes a priority field 310. The priority field 310 may indicate the priority associated with the memory access request 301, and the memory network 100 may thus determine the priority level for processing the memory access request through the priority field 310 of the memory access request 301. The priority field 310 may be set by any element in the computing system 200, such as via a memory controller of the compute nodes sending the memory access request 301. The memory controller or other element of the computing system 200 may label the memory access traffic according to any of the techniques described above, e.g., according to a memory address-based labeling scheme or a node-based labeling scheme.

Elements of the computing system 200 may implicitly label memory access traffic, e.g., by identifying a particular priority level for memory access traffic without adding any additional or explicit priority labels. In the example shown in FIG. 3, the memory access request 301 includes a target memory address 312, which may refer to any memory address specified in the memory access request 301 (e.g., a source address, a destination address, or both). The memory network 100 may implicitly label (e.g., identify) a priority for the memory access request 301 by determining, for example, whether the target memory address 312 falls within an elevated priority memory address range, corresponds to a particular elevated priority memory or compute node, or both.

Upon determining a priority level for the memory access request 301, the memory network 100 may process the memory access request 301 according to the determined priority level. As one example shown in FIG. 3, the memory network 100 may include multiple queues 320, which may differ according to priority. For instance, the memory network 100 (or a switch within the memory network 100) may include a number of queues 320 equal to the number of memory access priority levels that the memory network 100 services. The memory network 100 may buffer a particular memory access request 301 to the particular queue among the queues 320 associated with a determined priority for the request 301. In dequeuing memory access requests from the queues 320 for processing, the memory network 100 may employ an arbitration scheme to select which of the queues 320 to process a memory access request from. For example, the memory network 100 may utilize a weighted round robin scheme, weighted fair queuing scheme, or any bandwidth share scheme to dequeue access requests from the queues 320 to process, through which the memory network 100 may provide a greater proportion of access bandwidth to higher priority queues or otherwise provide differentiated service to the various memory access priority levels.

In some examples, the memory network 100 provides a guaranteed memory access bandwidth for some or all of the memory access priority levels. To illustrate, the memory network 100 may provide a total memory access bandwidth to the shared memory 201 referred to as $B_L$. The memory network 100 may, in one example, allocate a reserved access bandwidth amount of $B_R$ for memory access requests of a highest priority level $P_0$, and share the remaining bandwidth $B_L$-$B_R$ among the remaining priority levels. In providing guaranteed resource reservations, the memory network 100 may reserve a respective portion of the memory access bandwidth for none, some, or all of the memory access priority levels. In some implementations, the memory network 100 does not provide guaranteed access bandwidth to priority levels identified as best effort traffic, which may characterize a lowest or non-elevated priority level.

The memory network 100 may allocate guaranteed resource bandwidth in response to receiving a bandwidth allocation instruction. In some examples, the memory network 100 receives the bandwidth allocation instruction from a monitoring system that may dynamically adjust priority levels and memory access prioritization based on meeting or violation SLA and QoS requirements of applications executing in the computing system 200. Features of a monitoring system are described in greater detail below with reference to FIGS. 6 and 7. In some examples, the memory network 100 supports a reservation protocol, such as the resource reservation protocol (RSVP), to receive service requests and configure and maintain a bandwidth allocation states with guaranteed resource reservations.

Figure 4:
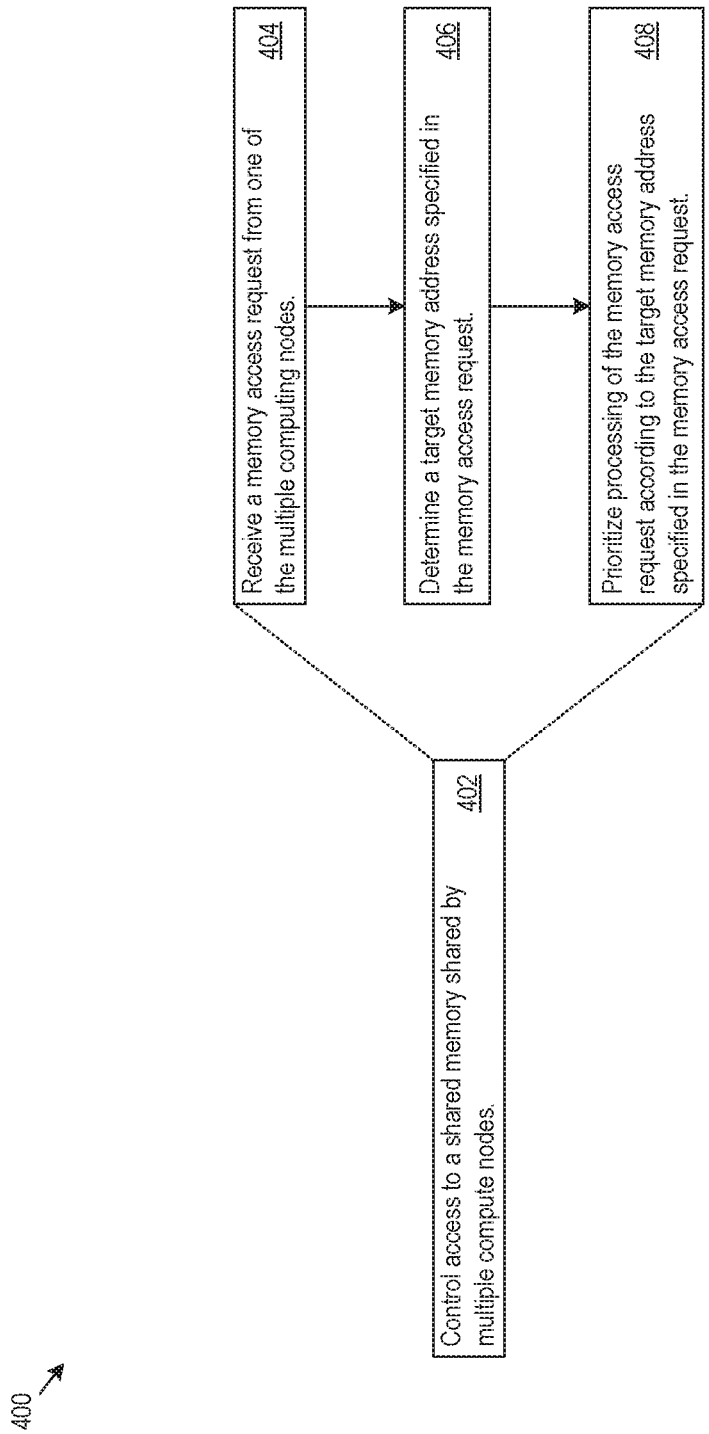
FIG. 4 shows an example of logic that the memory network may implement.

FIG. 4 shows an example of logic 400 that the memory network 100 may implement. The memory network 100 may implement the logic 400 as hardware, software, or a combination thereof. For example, the memory network 100 may implement the logic 400 through circuitry in the memory network 100. The memory network 100 may control access to a memory shared by multiple compute nodes (402). The multiple compute nodes may be part of a computing system 200 hosting multiple applications, and the memory network 100 may provide differentiated QoS for memory accesses to a memory shared by the multiple applications. To control the access to the memory, the memory network 100 may receive a memory access request 301 from one of the multiple compute nodes (404) and determine a target memory address 312 specified in the memory access request (406). The target memory address 312 determined by the memory network 100 may be any address that is part of the memory access request 301, such as a source address (e.g., for a load operation), a destination address (e.g., for a store operation), or both (e.g., for a memory copy operation).

The memory network 100 may prioritize processing of the memory access request according to the target memory address 312 specified in the memory access request 301 (408). Prioritizing the process of the memory access request may include determining that the target memory address 312 specified in the memory access request 301 is within an elevated priority memory address range. The elevated priority memory address range may correspond to a memory address range in the memory utilized by a particular application executing on the multiple compute nodes, e.g., a high priority application or an application with a violated SLA. The memory network 100 may further assign an elevated priority for processing the memory access request 301, e.g., by queuing the memory access request 301 into an elevated priority queue in the memory network 100. When the memory network 100 determines that the target memory address 312 specified in the memory access request 301 is not within an elevated priority memory address range, the memory network 100 may assign a non-elevated priority (e.g., best effort) for processing the memory access request 301.

Figure 5:
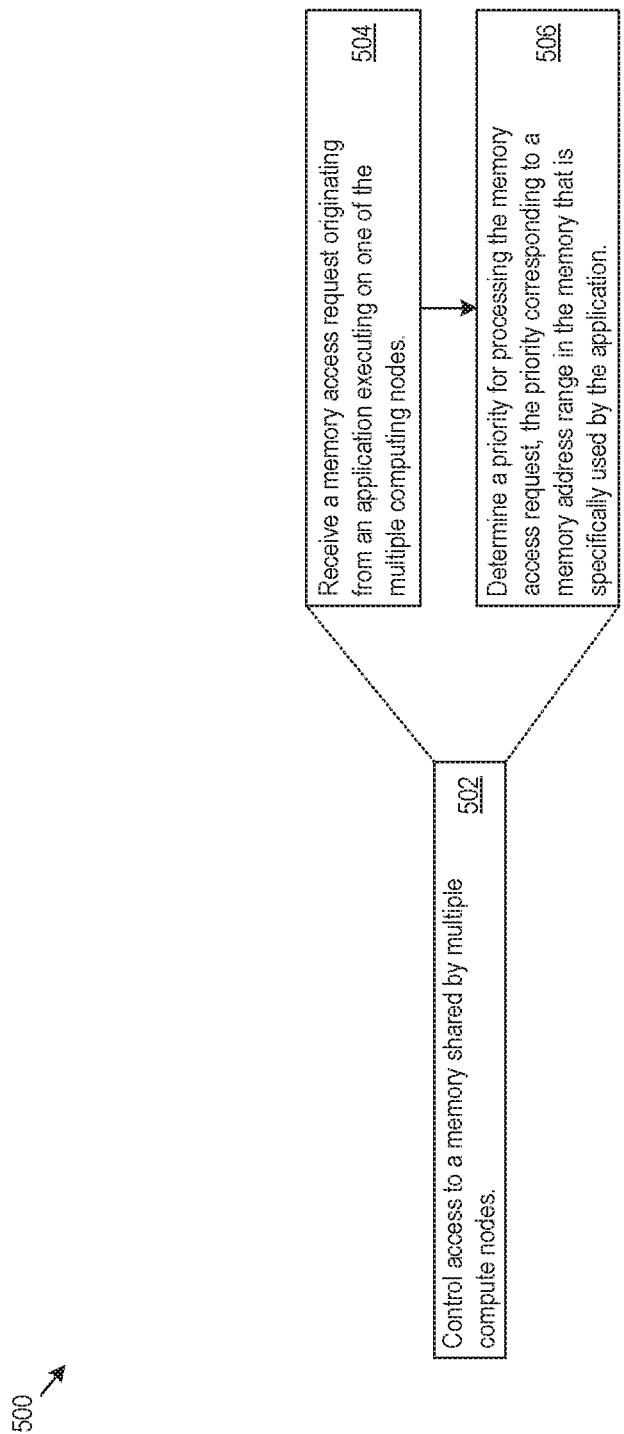
FIG. 5 shows another example of logic that the memory network may implement.

FIG. 5 shows another example of logic 500 that the memory network 100 may implement. The memory network 100 may implement the logic 500 as hardware, software, or a combination thereof. The memory network 100 may control access to a memory shared by multiple compute nodes (502), which may include receiving a memory access request 301 originating from an application executing on one of the multiple compute nodes (504) and determining a priority for processing the memory access request 301, the priority corresponding to a memory address range in the memory that is specifically used by the application (506).

Any combination of the computing system 200, including the memory network 100, compute nodes, the shared memory 201 and memory modules, and other portions thereof may support prioritized processing of memory accesses to the shared memory 201. In that regard, the priority of a memory access request 301 to the shared memory 201 may be labeled (e.g., identified) according to a target memory address 312 within the memory access request 301 itself, according to a node-based labeling scheme, or combinations of both. The memory network 100 may process the memory access request 301 according to memory access priority levels, thus providing differentiated service for memory accesses to the shared memory 201. Moreover, the computing system 200 may provide reserved resource guarantees for selected memory access priority levels enforced by the computing system 200, such as memory access bandwidth through the memory network 100. As yet another feature, the computing system 200 and elements thereof may support dynamic adjustment of memory access priority levels, as described next.

Figure 6:
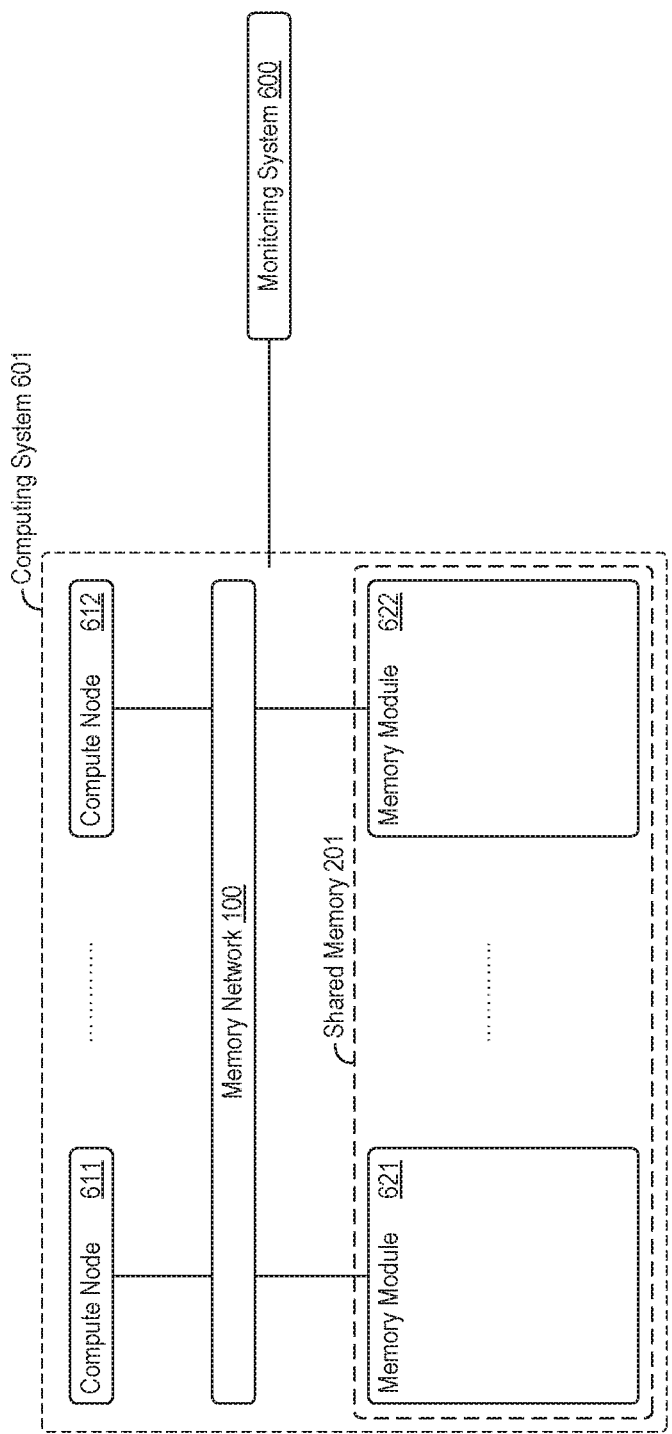
FIG. 6 shows an example of a monitoring system that supports dynamic adjustment to memory access priority levels for a computing system.

FIG. 6 shows an example of a monitoring system 600 that supports dynamic adjustment to memory access priority levels for a computing system 601. The monitoring system 600 may be implemented as any combination of circuitry, logic, devices, systems, or modules that monitor a computing system 601 as described below. Although illustrated as separate to the computing system 601 in the example shown in FIG. 6, the monitoring system 600 may be implemented as part of the computing system 601.

The monitoring system 600 may monitor selected portions of the computing system 601 to support dynamic adjustment of QoS parameters (e.g., memory access priority level) for accesses to a shared memory 201. The computing system 601 may include a memory network 100, a shared memory 201, and multiple compute nodes, such as the compute nodes labeled as 611 and 612 in FIG. 6. The shared memory 201 may include multiple memory modules, such as the memory modules labeled as 621 and 622 in FIG. 6. The computing system 601 may host multiple applications, which may execute on the compute nodes of the computing system 601 (e.g., 611 and 612).

The monitoring system 600 may identify QoS requirements of any application executing in the computing system 601. For example, the monitoring system 600 may maintain a configuration file through which an executing application may specify an SLA requirement. As another example, the monitoring system 600 may receive a requirement message from the executing application itself, the requirement message specifying the SLA requirements for the executing application. In some implementations, the monitoring system 600 enforces a requirement threshold for SLA requirements provided by an application, which may limit an amount of system resources that the computing system 601 will provide to meet the SLA requirements of the application. In this way, the monitoring system 600 may prevent an application from requesting and/or utilizing an inordinate amount of system resources, which may prevent resource misuse of the computing system 601 by a particular application.

The monitoring system 600 may dynamically adjust memory access priority according to various states that control memory access priority levels in the computing system 601. One exemplary illustration of states that the monitoring system 600 may support is presented next. In an initial state, the monitoring system 600 may specify that memory access traffic from any application be assigned a non-elevated priority level, e.g., a best effort priority level. In that regard, the monitoring system 600 may instruct corresponding elements of the computing system 601 to label and process memory access requests at the non-elevated priority level. In this initial state, the memory network 100 may treat memory access requests from applications executing in the computing system 601 as best effort memory traffic and process the memory access requests accordingly. In this continuing illustration, the non-elevated priority level is referred to as priority $P_2$, which may be the lowest memory access priority level supported by the computing system 601.

The monitoring system 600 may determine to transition from the initial state to a second state based on any number of memory access contention factors. In some implementations, the monitoring system 600 determines to transition to a second state when memory access contention for the shared memory 201 or contention in the memory network 100 causes a violation of a SLA requirement for an application executing in the computing system 601. In that regard, the monitoring system 600 may monitor for (i) violation of application SLA requirements, (ii) memory access contention for the shared memory 201 or memory network 100, (iii) or both.

The monitoring system 600 may monitor for violations of any SLA requirements for applications executing in the computing system 601. For example, the monitoring system 600 may track particular system values or parameters relevant to a particular application SLA requirement, such as available memory or processing bandwidth or according to any other metric specified by an application SLA requirement. The monitoring system 600 may receive a violation notification from application with a violated SLA requirement, as the application itself may monitor whether the computing system 601 is meeting its SLA requirements.

The monitoring system 600 monitor for memory access contention to the shared memory 201 or contention in the memory network 100. In doing so, the monitoring system 600 may correlate whether an SLA requirement violation has occurred as a result of contention to the shared memory 201 or in the memory network 100. For example, the monitoring system 600 may identify contention when identifying a stall, delay, or other performance interruption in a queue 320 (e.g., caused by excessive consumption of resources) or when memory traffic directed to a particular address or address range exceeds a contention threshold. As other examples, the monitoring system may determine that the queue fill level exceeds a threshold, e.g., output queues directed to the memory range corresponding to the affect application. Thus, when the monitoring system 600 identifies a violation to a SLA requirement for a particular application, the monitoring system 600 may further determine whether the SLA violation correlates to or is caused by contention. If so, the monitoring system 600 may identify the memory access contention for the shared memory 201 as a possible cause of the SLA violation for the particular application. In this case, the monitoring system 600 may transition to a second state.

In the second state, the monitoring system 600 may elevate the memory access priority level of an application, e.g., the particular application with a violated SLA requirement possibly caused by memory access contention for the shared memory 201 or in the memory network 100. The monitoring system 600 may assign an elevated priority for the affected application, which is referred to as $P_1$ in this continuing illustration. To elevate the priority of the affected application, the monitoring system 600 may instruct elements of the computing system 601 to label memory access traffic for the affected application as elevated priority level $P_1$. For example, the monitoring system 600 may identify the specific memory address range in the shared memory 201 used by the affected application as an elevated priority memory address range. The monitoring system 600 may further instruct memory controllers of the compute nodes, the memory network 100, and/or other elements of the computing system 601 to label memory access traffic with a target memory address in the elevated priority memory address range as elevated priority $P_1$. Along similar lines, for node-based labeling schemes, the monitoring system 600 may identify and indicate elevated priority nodes to elements of the computing system 601, thus causing the computing system 601 treat memory access traffic involving the elevated priority nodes to be labeled as elevated priority $P_1$. Thus, in the second state, the memory network 100 may prioritize handling of memory access traffic for the affected application, e.g., via a weighted round robin arbitration of selection of queues 320 in the memory network 100 to process memory access requests.

Upon receiving priority adjustment instructions from the monitoring system 600, the memory network 100 may adjust a priority associated with a particular memory address range and flexibly adapt how the memory network 100 subsequently processes a memory access request 301 targeted within the particular memory address range. For example, the memory network 100 may increase the associated priority by identifying the particular memory address range as an elevated or higher priority memory address range, e.g., instead of a non-elevated memory address range. As another example, the memory network 100 may decrease the associated priority by identifying the particular memory address range as a non-elevated or lesser priority memory address range. Other elements of the computing system 600 may make similar priority adjustments.

In the second state, the monitoring system 600 may continue to monitor the computing system 601 for memory access contention and SLA requirement violation. When the memory load decreases beyond a transition threshold, when no SLA requirements are not violated (e.g., the computing system 601 now meets the SLA requirements of the affected application), or both, the monitoring system 600 may transition back to the initial state, thus returning memory access traffic for the affect application back to the $P_2$ priority. When the memory load remains the same or increases beyond a second threshold amount, when the SLA violations for the affected application continue, when additional application SLA requirement violations are identified, or any combination thereof, then the monitoring system 600 may transition to a third state.

In the third state, the monitoring system 600 may increase the memory access priority level of the affected application to a highest priority in this illustration, which is referred to as priority level $P_0$. The monitoring system 600 may instruct elements of the computing system 601 regarding the increased priority of the affected application in similar ways as described above. It is noted that the monitoring system 600 may modify memory access priority level for any of the applications executing in the computing system 601, and thus applications in this illustration may have a priority level of $P_0$, $P_1$, or $P_2$ at any given moment, with higher priorities given increased memory access bandwidth to the shared memory 201.

The monitoring system 600 may selectively provide a resource guarantee for none, some, or all of the memory access priority levels. In doing so, the monitoring system 600 may ensure that a particular application is guaranteed memory access, e.g., sufficient to meet the SLA requirement of particular application. In some examples, the monitoring system 600 selectively provides the resource guarantee when multiple applications are identified as priority level $P_0$, e.g., beyond a threshold number. The monitoring system 600 may utilize a bandwidth reservation mechanism to provide a guaranteed amount of memory access bandwidth to process memory access requests of priority level $P_0$. When the memory load decreases beyond another transition threshold, when no SLA requirements are reduced or no longer violated (e.g., the computing system 601 now meets the SLA requirements of the affected application), or both, the monitoring system 600 may transition back to the second state.

The initial, second, and third states presented in the above illustration are but one example of dynamic memory access QoS adjustments the monitoring system 600 may support. However, the monitoring system 600 may support dynamic memory access priority level adjustments with any number of priority states or across various additional or alternative criteria for transitioning states, identifying memory access contention, and according to any number of parameters or configurations. For example, a system administrator may configure the monitoring system 600 to specify any number for customized factors for adjusting priority levels for applications.

Figure 7:
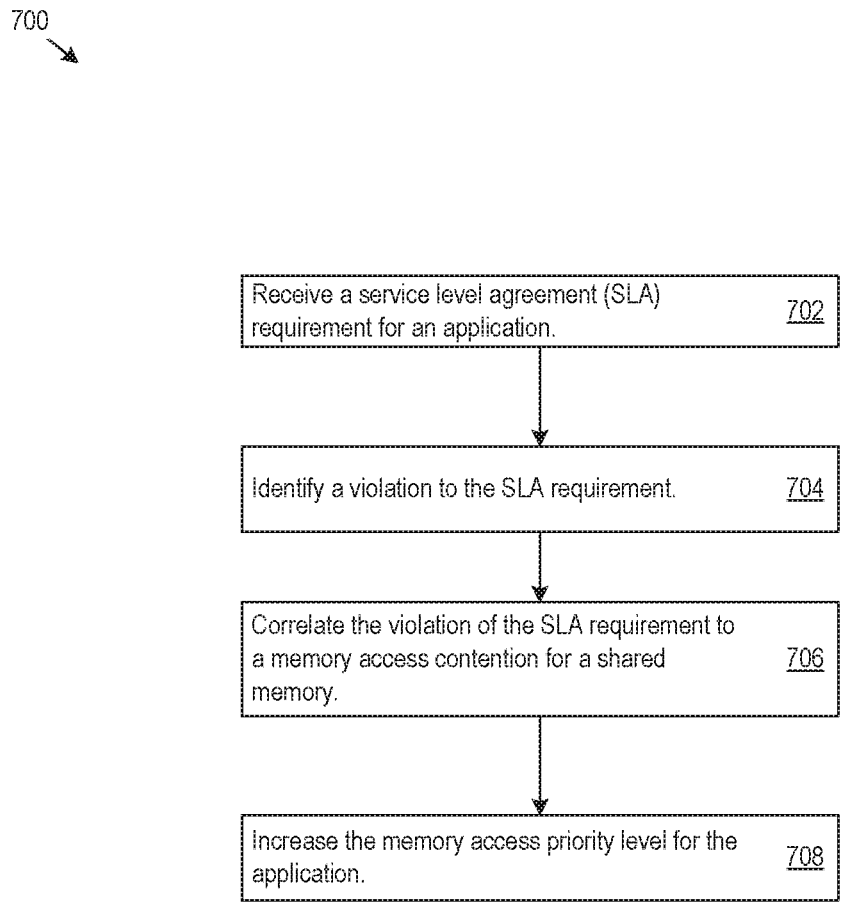
FIG. 7 shows an example of logic that the monitoring system may implement.

FIG. 7 shows an example of logic 700 that the monitoring system 600 may implement. The monitoring system 600 may implement the logic 700 in hardware, software, or a combination of both. For the example, the monitoring system 600 may implement that logic 700 as executable instructions that the monitoring system 600 may store on a computer-readable memory, such as a memory.

The monitoring system 600 may receive an SLA requirement for an application (702), such as an application executing in the computing system 601. The monitoring system 600 may maintain a configuration file specifying the SLA requirement(s) for the application. The monitoring system 600 may dynamically adjust the memory access priority level for the application, e.g., in response to memory access contention and/or violation of the SLA requirement. In that regard, the monitoring system 600 may identify a violation to the SLA requirement of the application (704) and correlate the violation of the SLA requirement to a memory access contention for the shared memory 201 (706). In correlating the SLA violation to the memory access load, the monitoring system 600 may employ any of the techniques described above to identify memory access contention, access frequency for a particular portion of the shared memory 201 used by the application, and/or any other factors relevant to correlating the SLA violation as being caused (at least in part) by memory access contention to the shared memory 201.

In response to correlating the violation of the SLA requirement to the memory access contention, the monitoring system 600 may increase the memory access priority level for the application (708). As described above, the monitoring system 600 may do so by instructing the memory network 100, a memory controller of a compute node, or any other element of the computing system 601 to specifically identify a particular memory address range or nodes used by the application as elevated priority as well as to prioritize handling of memory access requests involving the particular memory address range and/or nodes accordingly. Thus, the monitoring system 600 may dynamically adjust the memory access priority levels for an application executing in a computing system 601 in any of the ways describe above, and thus provide differentiated QoS for memory accesses by the application to a shared memory 201.

As another feature, the monitoring system 600 may preemptively adjust the memory access priority level for an application, e.g., even when the monitoring system 600 has not identified an SLA requirement violation or memory access contention for the shared memory 201. The monitoring system 600 may track and analyze memory load and/or SLA violation data to identify memory contention trends in the computing system 601. As one example, the monitoring system 600 may identify a periodicity when a particular application experiences SLA violations or when access load on the shared memory 201 increases beyond the contention threshold. As another example, the monitoring system 600 may determine that SLA violations due to memory contention occur when particular applications execute concurrently on the computing system 601. The monitoring system 600 may preemptively adjust the memory access priority level of a particular application according to the determined contention trends, even before an SLA requirement of the application is violated. In some implementations, the monitoring system 600 may preemptively increase or decrease the memory access priority level for an application according to the periodicity of memory load increases and decreases.

Figure 8:
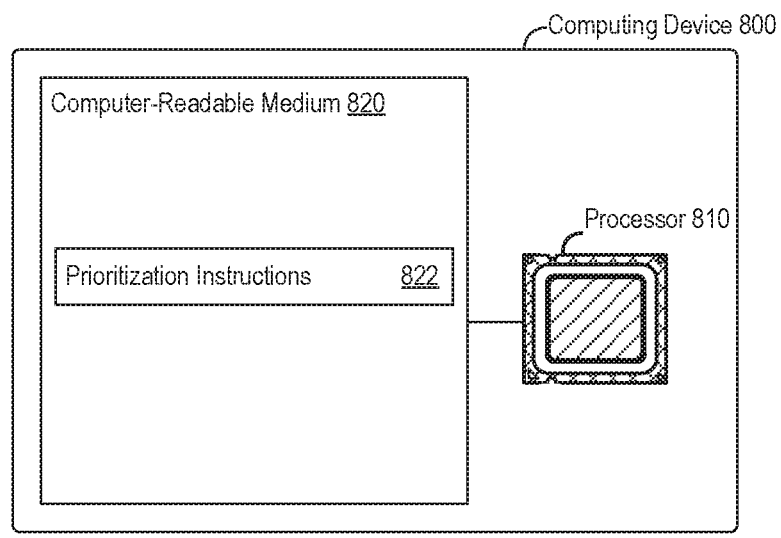
FIG. 8 shows an example of a computing device that supports prioritizing memory accesses to a shared memory.

FIG. 8 shows an example of a computing device 800 that supports prioritizing memory accesses to a shared memory 201. In that regard, the computing device 800 may implement any of the functionality described herein, including any functionality described above for the memory network 100, the monitoring system 600, any element of the computing systems 200 or 601, or any combination thereof.

The computing device 800 may include a processor 810. The processor 810 may include a central processing unit (CPU), microprocessor, and/or any hardware device suitable for executing instructions stored on a computer-readable medium. The computing device 800 may include a computer-readable medium 820. The computer-readable medium 820 may be any electronic, magnetic, optical, or other physical storage device that stores executable instructions, such as the prioritization instructions 822 shown in FIG. 8. Thus, the computer-readable medium 820 may be, for example, Random Access Memory (RAM), an Electrically-Erasable Programmable Read-Only Memory (EEPROM), a storage drive, an optical disk, and the like.

The computing device 800 may execute instructions stored on the computer-readable medium 820 through the processor 810. Executing the instructions may cause the computing device 800 to perform any of the features described herein. One specific example is shown in FIG. 8 through the prioritization instructions 822. Executing the prioritization instructions 822 may cause the computing device 800 to perform any combination of the functionality of the memory network 100 described above, such as receive a memory access request 301 from one of multiple computing nodes in a computing system, determine a target memory address 312 specified in the memory access request 301, and prioritize processing of the memory access request 301 according to the target memory address 312 specified in the memory access request 301. Additionally or alternatively, executing the prioritization instructions 822 may cause the computing device to perform any combination of the functionality of the monitoring system 600 described above, such as receiving an SLA requirement from an application executing in a computing system with a shared memory 201, identifying a violation to the SLA requirement, correlating the violation of the SLA requirement to memory access contention for the shared memory 201, and increasing the memory access priority level for the application.

The methods, devices, systems, and logic described above, including the memory network 100, the computing systems 200 and 601, and the monitoring system 600, may be implemented in many different ways in many different combinations of hardware, software or both hardware and software. For example, the memory network 100 and monitoring system 600 may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the circuitry, systems, devices, and logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the systems, devices, and circuitry described herein, including the memory network 100 and the monitoring system 600, may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments have been described, it will be apparent to those of ordinary skill in the art that many more embodiments and implementations are possible.

Some example implementations have been specifically described. Additional or alternative implementations are possible.

The invention claimed is:

1. A system comprising:
a memory network accessible by multiple compute nodes, the memory network to control access to a memory shared by the multiple compute nodes by:
receiving a first memory access request from a first compute node of the multiple compute nodes, wherein the first memory access request originates from an application executing on the first compute node, wherein the first memory access request specifies a quality of service (QoS) label of application data stored at the memory;
determining a target memory address within a particular memory access range of the memory specified in the first memory access request, wherein the target memory address is determined based at least in part on the quality of service (QoS) label of the application data;
determining a first priority for processing the first memory access request according to the target memory address specified in the first memory access request;
receiving a second memory request corresponding with a second priority, wherein the second priority corresponds with processing the second memory access request; and
when the first priority is greater than the second priority, allocating a greater portion of bandwidth for accessing the memory to the first memory access request, wherein the access is limited to the target memory address within the particular memory access range of the memory.

2. The system of claim 1, wherein the memory network is to determine an elevated priority for processing the first memory access request when the target memory address specified in the first memory access request is within an elevated priority memory address range.

3. The system of claim 2, wherein the memory network is further configured to control the access to the memory by allocating a guaranteed processing bandwidth for the first memory access requests with the elevated priority.

4. The system of claim 3, wherein the memory network is further configured to allocate the guaranteed processing bandwidth for elevated priority memory access requests in response to receiving a bandwidth allocation instruction from a monitoring system.

5. The system of claim 1, wherein the memory network is further configured to determine the first priority for processing the first memory access request through a priority field associated with the first priority in the first memory access request.

6. The system of claim 5, wherein the priority field is set by a memory controller of one of the multiple compute nodes according to a memory range that the target memory address is located.

7. The system of claim 1, wherein the first memory access request comprises a load operation, a store operation, or a copy operation.

8. The system of claim 7, wherein the target memory address specified in the first memory access request comprises a first source address for a load operation, a first destination address for a store operation, or both a second source address and second destination address for a memory copy operation.

9. A method comprising:
controlling access to a shared memory through a memory network shared by multiple compute nodes by:

receiving a first memory access request from a first compute node of the multiple compute nodes, wherein the first memory access request originates from an application executing on the first compute node, wherein the first memory access request specifies a quality of service (QoS) label of application data stored at the memory;

determining a target memory address within a particular memory access range of the memory specified in the first memory access request, wherein the target memory address is determined based at least in part on the quality of service (QoS) label of the application data;

determining a first priority for processing the first memory access request according to the target memory address specified in the first memory access request;

receiving a second memory request corresponding with a second priority, wherein the second priority corresponds with processing the second memory access request; and when the first priority is greater than the second priority, allocating a greater portion of bandwidth for accessing the memory to the first memory access request, wherein the access is limited to the target memory address within the particular memory access range of the memory.

10. The method of claim 9, wherein assigning the elevated priority for processing the first memory access request comprises queueing the first memory access request into an elevated priority queue.

11. The method of claim 10, wherein the range of memory addresses having an elevated priority corresponds to a memory address range utilized by a particular application executing on the multiple compute nodes.

12. The method of claim 9, further comprising:
adjusting a priority associated with a particular memory address range in the shared memory, where adjusting comprises:
decreasing the priority by identifying the particular memory address range as a non-elevated memory address range instead of an elevated priority memory address range; or
increasing the priority by identifying the particular byte addressable memory address range as an elevated memory address range instead of a non-elevated priority memory address range.

13. A method comprising:
controlling access to a shared memory through a memory network shared by multiple compute nodes by:
receiving a first memory access request originating from an application executing on the multiple compute nodes, wherein the first memory access request specifies a quality of service (QoS) label of application data stored at the memory;

determining a target memory address within a particular memory access range of the memory specified in the first memory access request, wherein the target memory address is determined based at least in part on the quality of service (QoS) label of the application data;

determining a first priority for processing the first memory access request, wherein the priority corresponds to a memory address range in the memory that is specifically used by the application;

receiving a second memory request corresponding with a second priority, wherein the second priority corresponds with processing the second memory access request; and when the first priority is greater than the second priority, allocating a greater portion of bandwidth for accessing the memory to the first memory access request, wherein the access is limited to the target memory address within the particular memory access range of the memory.

14. The method of claim 13, further comprising allocating a guaranteed processing bandwidth for elevated priority memory access requests in response to receiving a bandwidth allocation instruction from a monitoring system.

15. The method of claim 13, further comprising adjusting the priority that corresponds to the memory address range specifically used by the application by increasing the priority or decreasing the priority corresponding to the memory address range.

16. The method of claim 13, wherein determining the priority for processing the memory access request comprises:
identifying that the memory address range specifically used by the application is an elevated priority memory address range; and
determining that a target memory address specified in the first memory access request is within the elevated priority memory address range, and in response:
assigning an elevated priority for processing the first memory access request.

* * * * *